March 17, 1959 — F. W. TYBUS — 2,877,792
SURGE OR BACK FLOW VALVE
Filed Oct. 12, 1956

INVENTOR.
FRANK W. TYBUS
BY McMorrow, Berman & Davidson
ATTORNEYS

United States Patent Office 2,877,792
Patented Mar. 17, 1959

2,877,792

SURGE OR BACK FLOW VALVE

Frank W. Tybus, Long Beach, Calif.

Application October 12, 1956, Serial No. 615,705

2 Claims. (Cl. 137—512.1)

This invention relates to valves, and more particularly to a check valve designed to control the back flow of fluid in a vertical pipe line, such as in a deep well turbine pump.

A main object of the invention is to provide a novel and improved back flow control valve for a vertical pipe line, said valve being simple in construction, being easy to install, and serving to control the back flow in a vertical pipe line leading to a turbine pump or similar machine, whereby the back loading on the movable parts of the machine is controlled, and whereby bearing failures due to reversal of direction and pressure of the load on the rotary or other moving parts of the machine are avoided.

A further object of the invention is to provide an improved back flow control valve for a vertical pipe line, said valve being inexpensive to fabricate, being durable in construction, and being quiet in operation.

Further objects and advantages of the invention will become apparent from the following description and claims, and from the accompanying drawings, wherein:

Figure 1:
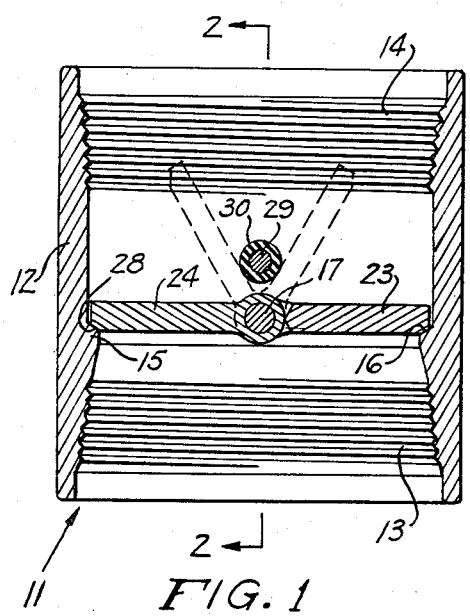
Figure 1 is a vertical cross sectional view taken through an improved check valve constructed in accordance with the present invention, the movable valve elements being shown in closed positions.
Figure 2:
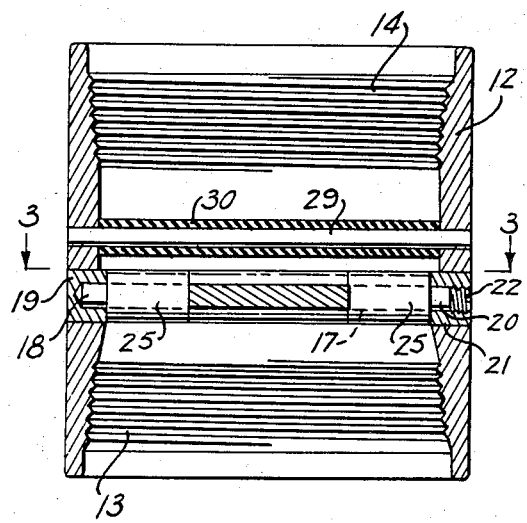
Figure 2 is a vertical cross sectional view taken on the line 2—2 of Figure 1.

Referring to the drawings, and more particularly to Figures 1, 2 and 3, 11 generally designates a check valve adapted to be connected in the vertical pipe line leading to a turbine pump, or the like, to control back flow in said pipe line. The valve 11 comprises a generally cylindrical main body 12 formed with the lower internal threads 13 and the upper internal threads 14, whereby the body 12 may be connected in a vertical pipe line in the same manner as a conventional pipe coupling.

The body 12 is internally formed with an annular rib 15 located in the intermediate portion of the interior of said body, said rib 15 having a beveled top surface 16, whereby the rib 15 defines a valve seat. Designated at 17 is a diametrically extending hinge pin having one end thereof, shown at 18, rotatably engaged in a bearing cup member 19 rigidly secured in the wall of the body 12 and having its other end, shown at 20, rotatably supported in a sleeve member 21 rigidly secured in the wall of body 12 diametrically opposite the cup element 19. A plug 22 is threadedly engaged in the sleeve 21 to retain the pin 17 in the position thereof shown in Figure 2.

Figures 3, 4, 5:
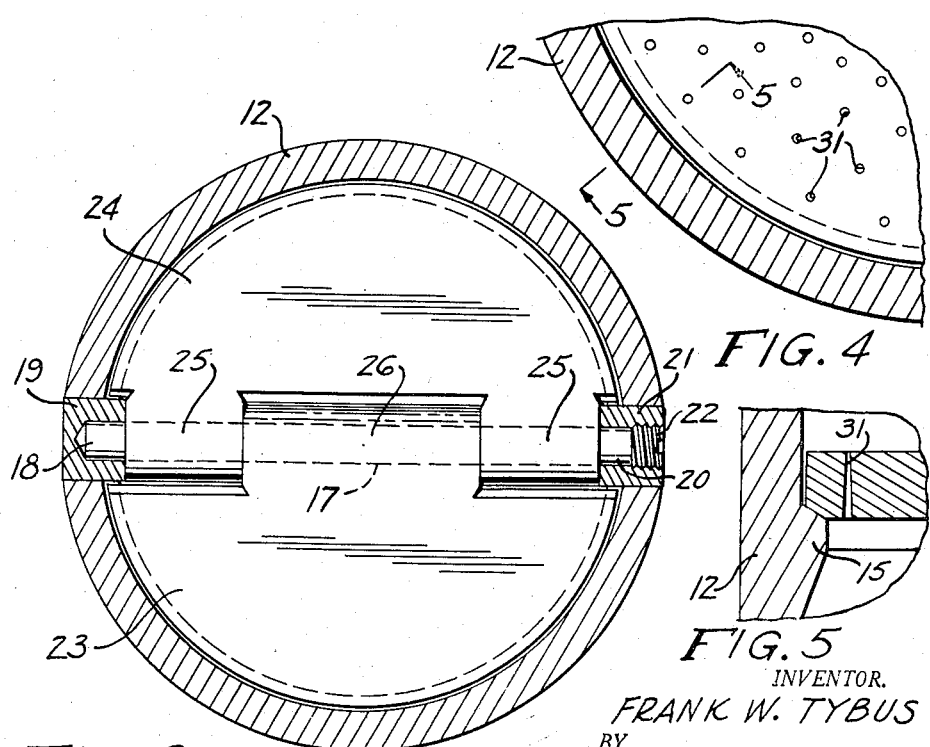
Figure 3 is an enlarged horizontal cross sectional view taken on the line 3—3 of Figure 2.
Figure 4 is a fragmentary enlarged horizontal cross sectional detail view, showing a modification of the valve.
Figure 5 is a vertical cross sectional detail view taken on the line 5—5 of Figure 4.

The members 19 and 21 are located on a center line slightly above the plane of the annular valve seat 15. Designated at 23 and 24 are respective generally semicircular, mating valve flaps hingedly connected to the hinge pin 17. Thus, the segment 24 is provided with a pair of hinge sleeves 25, 25 receiving the pin 17, and the segment 23 is provided with an intermediate hinge sleeve 26 also receiving the hinge pin 17 and engaged between the hinge sleeves 25, 25 in alignment therewith, as shown in Figure 3.

The flaps 23 and 24 are formed with beveled outer edge portions 28 engageable on the beveled surface 16 of the valve seat 15, as shown in Figure 1.

Diametrically secured in the body 12 above and in vertical alignment with the hinge pin 17 is a transversely extending stop pin 29 provided with a tubular sheath 30 of resilient deformable material, such as rubber, or the like, and of substantial thickness, serving as a resilient stop means for limiting the upward rotation of the valve flaps 23 and 24, whereby said valve flaps are restrained from moving upwardly beyond the dotted view positions thereof shown in Figure 1.

In operation, when back flow occurs in the pipe line, the fluid forces the segments 23 and 24 upwardly, and when the back pressure diminishes, the valve segments 23 and 24 drop back to their horizontal positions, shown in full line view of Figure 1, trapping the liquid in the portion of the pipe above the valve 11. This relieves the pump or other machine connected to the pipe from the effects of uncontrolled back flow, since the back flow of the liquid is restrained by the valve elements 23 and 24. The back flow of the liquid will take place at a very slow rate, because of the leakage between the valve segments 23 and 24 and the annular valve seat 15, but such back flow will not cause any serious adverse effects to the pump or other machine connected to the pipe line.

As above mentioned, uncontrolled back flow in turbine pumps or other machines acts to cause bearing failure, or other serious damage to the machine, because of the reversal of the direction of fluid flow and consequent reversal of pressure on the bearings in the pump, or other machine connected to the pipe line.

Referring to Figures 4 and 5, the semicircular valve segment may be formed with spaced apertures 31 to permit a more positive, although retarded, return flow of the liquid trapped above the check valve device 11 after a surge occurs. As shown in Figure 5, the apertures 31 are relatively small and preferably flare downwardly in diameter.

As will be readily understood, when a surge occurs, the flaps 23 and 24 are elevated and rotate upwardly to their dotted view positions, shown in Figure 1, being restrained against further upward rotation by engagement with the resilient sheath 30 on the stop pin 29. The sheath 30, being of deformable resilient material, provides quiet contact of the flaps 23 and 24 therewith, whereby the action of the valve is substantially noiseless. After the surge subsides, the flaps 23 and 24 descend to their normal closed positions, shown in full line view in Figure 1, and the liquid drains back slowly at a controlled rate to the lower portion of the pipe line, preventing undesired reversal of pressure on the bearings and other moving parts of the pump or other machine connected to the pipe line.

While certain specific embodiments of an improved check valve device have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A check valve comprising a generally cylindrical main body, an annular valve seat formed on the interior surface of said main body at the intermediate portion thereof, a diametrically extending hinge pin secured in said body slightly above and adjacent the plane of said annular seat, a pair of mating semicircular valve flaps hingedly connected to said hinge pin and being formed and arranged to engage on said seat in substantially horizontal positions, said flaps being swingable upwardly off said seat to open positions responsive to flow of fluid therepast through said main body in one direction, but not in the other, a diametrically extending stop member secured in said main body parallel to and above said hinge pin and spaced above the plane of said seat, and a resilient deformable tubular sheath on said stop member, said sheath being engageable by said valve flaps to limit and cushion the opening movement of said flaps.

2. A check valve comprising a generally cylindrical main body, an annular valve seat formed on the interior surface of said main body at the intermediate portion thereof, a diametrically extending hinge pin secured in said body slightly above and adjacent the plane of said annular seat, a pair of mating semicircular valve flaps hingedly connected to said hinge pin and being formed and arranged to engage horizontally on said seat, said flaps being swingable upwardly off said seat to open positions responsive to flow of fluid therepast through said main body in one direction but not in the other, a diametrically extending stop member secured in said main body parallel to and above said hinge pin and spaced above the plane of said seat, said flaps being formed with constricted apertures to allow predetermined leakage through the valve when the flaps are in closed positions, and a resilient deformable tubular sheath on said stop member, said seath being engageable by said valve flaps to limit and cushion the opening movement of said flaps.

References Cited in the file of this patent

UNITED STATES PATENTS

| | | |
|---|---|---|
| 407,981 | Williams | July 30, 1889 |
| 920,716 | Beckman | May 4, 1909 |
| 1,105,556 | Fouts | July 28, 1914 |
| 1,306,391 | Romanoff | June 10, 1919 |
| 1,743,731 | Scott | Jan. 14, 1930 |
| 1,793,547 | Gray | Feb. 24, 1931 |
| 2,086,236 | Peo | July 6, 1937 |
| 2,163,472 | Shimer | June 20, 1939 |
| 2,761,469 | Hansen | Sept. 14, 1956 |

FOREIGN PATENTS

| | | |
|---|---|---|
| 156,325 | France | June 30, 1883 |